United States Patent
Rowley et al.

[11] Patent Number: 6,116,884
[45] Date of Patent: Sep. 12, 2000

[54] MOLD CORE FOR OVERMOLDED FLEXIBLE VALVE

[76] Inventors: William W. Rowley, 35 Wilding Chase, Chagrin Falls, Ohio 44022; Richard T. Seman, 10935 Shadowood Dr., Newbury, Ohio 44065

[21] Appl. No.: 09/181,534

[22] Filed: Oct. 28, 1998

Related U.S. Application Data

[62] Division of application No. 08/951,222, Oct. 16, 1997, Pat. No. 5,965,077.

[51] Int. Cl.$^7$ .......................... B29C 33/12; B29C 33/76; B29C 45/33
[52] U.S. Cl. .......................... 425/111; 425/127; 249/89; 249/180
[58] Field of Search .......................... 264/263; 425/111, 425/123, 127, DIG. 58; 249/89, 91, 178, 185, 180

[56] References Cited

U.S. PATENT DOCUMENTS

| | | | |
|---|---|---|---|
| 3,383,750 | 5/1968 | Schroeder et al. | 425/123 |
| 3,834,257 | 9/1974 | Ganser | 82/44 |
| 3,920,787 | 11/1975 | McDowell et al. | 264/263 |
| 3,940,227 | 2/1976 | Strasser | 249/180 |
| 3,986,738 | 10/1976 | Van Der Velde | 285/403 |
| 4,130,264 | 12/1978 | Schroer | 249/180 |
| 4,138,460 | 2/1979 | Tigner | 264/159 |
| 4,229,014 | 10/1980 | Crowe | 279/2 |
| 4,238,180 | 12/1980 | Gordon etal. | 425/403 |
| 4,239,473 | 12/1980 | Fulhaber | 425/392 |
| 4,261,947 | 4/1981 | Ogi | 264/263 |
| 4,470,784 | 9/1984 | Piotrovsky | 425/116 |
| 4,754,543 | 7/1988 | Spivy | 29/557 |
| 4,915,609 | 4/1990 | Hahn et al. | 249/180 |
| 5,160,474 | 11/1992 | Huff | 264/255 |
| 5,182,032 | 1/1993 | Dickie et al. | 249/91 |
| 5,246,065 | 9/1993 | Huff | 165/173 |
| 5,302,336 | 4/1994 | Hartel et al. | 264/263 |
| 5,305,741 | 4/1994 | Moles | 128/207 |
| 5,314,135 | 5/1994 | Forrest, Jr. et al. | 242/72.1 |
| 5,403,179 | 4/1995 | Ramsey | 425/DIG. 58 |
| 5,540,582 | 7/1996 | Catalanotti et al. | 425/577 |
| 5,556,411 | 9/1996 | Fabris et al. | 279/2.08 |
| 5,637,407 | 6/1997 | Hert et al. | 428/474.7 |
| 5,656,693 | 8/1997 | Bllul et al. | 525/171 |
| 5,683,647 | 11/1997 | Kawasaki et al. | 425/127 |

*Primary Examiner*—Robert Davis
*Assistant Examiner*—Thukhanh T. Nguyen
*Attorney, Agent, or Firm*—Buckingham, Doolittle & Burroughs, LLP

[57] ABSTRACT

A mold core is provided for producing an overmolded flexible valve. The mold core comprises a mold body, a piston assembly, a piston retaining means, a collet bit positioning means and at least two collet bits. The mold core has a cylindrical void in a distal end and has a pressure means communicated with the cylindrical void. The piston assembly has a piston head sized and adapted for axial movement in the cylindrical void, with a piston shaft extending axially from the head. The shaft is tapered from a larger first diameter at one end to a smaller second diameter at the other end. The piston retaining means has a bore through it to allow insertion of the piston shaft. Each of the at least two collet bits has an inner cylindrical tapered surface segment, the taper of the surface segment being essentially the same as the taper in the piston shaft, and an outer cylindrical surface segment, sized and adapted to be inserted inside the flexible valve. The at least two collet bits are positioned adjacent to the tapered portion of the shaft. The collet bits are positioned by the collet bit positioning means.

9 Claims, 4 Drawing Sheets

MOLD CORE FOR OVERMOLDED FLEXIBLE VALVE

CROSS-REFERENCE TO PRIOR APPLICATION

This application is a divisional of Ser. No. 08/951,222, filed on Oct. 16, 1997, which is now U.S. Pat. No. 5,965,077.

TECHNICAL FIELD

This invention relates to an piston-like apparatus and a process for using the apparatus to manufacture an overmolded flexible valve for which longitudinal and radial alignment orientation must be maintained during subsequent overmolding operations.

BACKGROUND OF THE INVENTION

One-way check valves are present in a variety of applications for which the flow of a liquid or a gas is intended to be essentially unidirectional. While it is easy to properly align and insert these valves into stainless steel or copper tubes, this is not the case when the valve is flexible and the tube is either a rigid or flexible plastic, and particularly when subsequent manipulative steps are performed on the workpiece. These operations may shift the initial position of the flexible valve to a skewed position, thereby permitting the backflow of liquid through the valve, and defeating the purpose of the valve. This is particularly true during overmolding operations as will be discussed below wherein the valve inside the tube is subject to a pressurized heated mold environment such as is present in overmolding applications.

It is well known to encapsulate components within a plastic molding die cavity by rigidly affixing such components to or through the walls of the cavity. It is also known to avoid the appearance of holding devices at the surface of the molded product by providing retractable holding devices which retract out of the molding cavity while the molding material is setting up. It is also possible for the holding devices to retract into the center of the molded product. Such prior art holding devices and techniques, however, do not hold the encapsulated component in a precisely defined position, and are therefore, of limited usefulness. In many applications, the encapsulated components must maintain precise positions relative to other encapsulated components or with respect to the exterior contours of the molded product.

The problem of precisely positioning encapsulated components within an injection molding cavity can be further complicated by two additional factors. If the component to be encapsulated is not rigid, the problem of holding it in a precise position is far more difficult. Furthermore, the dimensions of the molded product may be such that very little leeway exists for positioning the encapsulated component away from the surfaces of the mold.

SUMMARY OF THE INVENTION

According to this invention, there is provided a method and apparatus for overmolding an elastomeric shape onto a plastic substrate conduit while maintaining the orientation of various components which are contained within the plastic conduit. In performing the method of the invention, the components within the plastic conduit are held in place during the overmolding operation by the operation of at least two opposed collet bits or fingers, which move radially in response to axial movement of a frustoconical shaft of a piston. The shaft is maintained in the extended axial position during the overmolding process, followed by axial retraction with corresponding radial retraction subsequent to the injection molding of the overmolded component.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DESCRIPTION OF THE PREFERRED EMBODIMENTS

Figure 1:
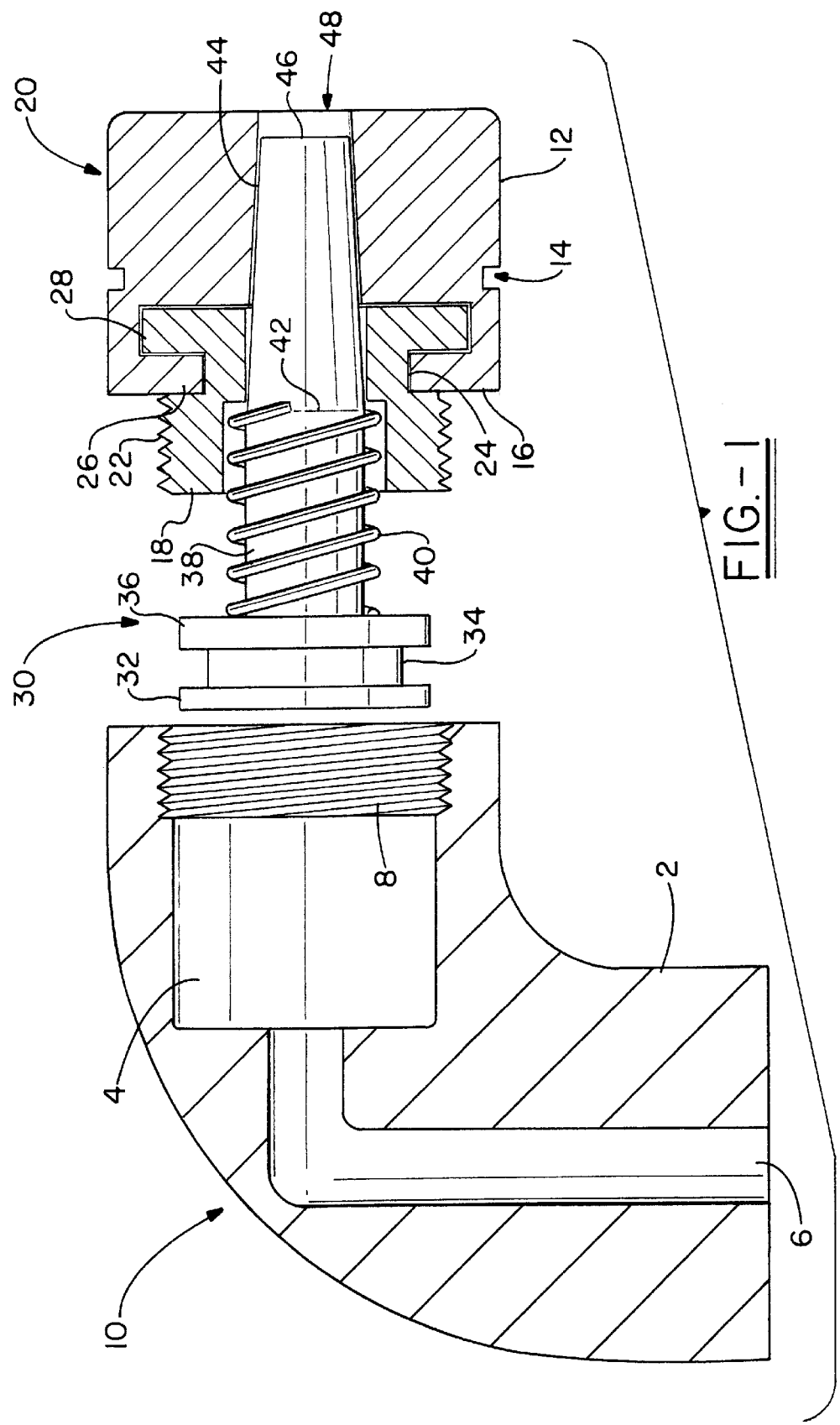
FIG. 1 is an assembly elevational view, in cross-section, showing the various elements forming the present invention.
Figure 3:
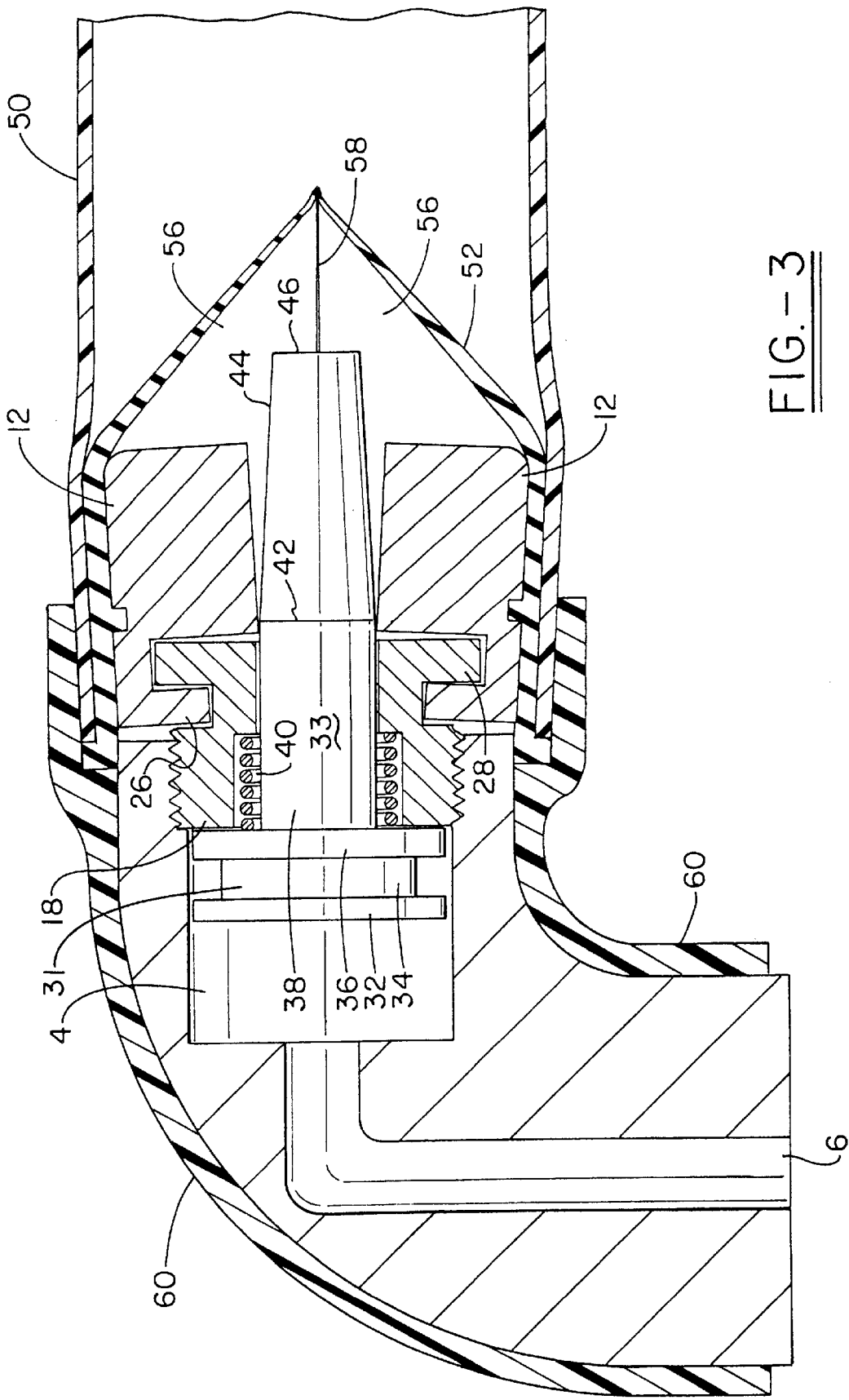
FIG. 3 is an elevational view, in cross-section, showing the operational position of the elements.

This invention will now be described in detail with referenced to preferred embodiments thereof. As illustrated in FIG. 1, the mold core 10 is comprised of a mold core body 2, a collet assembly 20 and an axially extendable piston assembly 30. The mold core body 2 is generally cylindrical and of dimensions suitable to be positioned inside an injection mold cavity (not shown) so as to permit molten polymer to flow about void space created between the mold core body and the mold cavity. The mold core body 2 may optionally have curves or bends associated therewith, depending upon the ultimate shape of the overmolded component desired. As shown in FIG. 1, the terminal end of the mold core body 2 is bent at approximately 90°, thereby resulting in an overmolded component of similar angularity after injection molding, as illustrated in FIG. 3.

Within mold core body 2 is a hollow, essentially cylindrical void 4 at a distal end 8 of the mold core body and a communicating conduit 6 with the cylindrical void 4 for the passage of a compressed gas from a controllable source (not shown) at the proximal end to the head space void of the cylindrical void 4 at the distal end. For most applications, this compressed gas will typically be air, although there is no reason to limit the application to such, and any compressible gas is usable in this invention. The distal end 8 of the cylindrical void 4 will generally be threaded, although this is not an essential aspect of the invention and retaining means other than threaded engagement are envisioned, e.g., bolts, welds, etc.

The cylindrical void 4 at the distal end of the mold core body 2 is dimensioned so as to be capable of receiving a moveable piston assembly 30 therein. The moveable piston assembly 30 comprises a piston head 31 and longitudinally extending shaft 33 projecting therefrom. The piston head 31 is an essentially cylindrical body with a first flange 32, a second flange 36, a gap between the two flanges defining an annular groove 34 for positioning of an O-ring 37 (shown in FIG. 2) therebetween. The flanges 32, 36 are dimensioned so as to permit insertion of the piston head 31 into the cylindrical void 4 and permit axial movement therein in response to pressure variations caused by the pressurizing and depressurizing of the conduit 6 and void space in the cylindrical void 4 above the piston head. The frustoconical longitudinally extending shaft 33 comprises a cylindrical first portion 38 adjacent to the second flange 36, said cylindrical first portion having a first outer diameter and a tapered conical portion 44 terminating in a second outer diameter which is smaller than the first outer diameter. The shaft 33 begins to taper from the first to the second outer diameter at tapering point 42, said point positioning being variable depending upon several factors, which include the degree of radial movement desired, degree of taper and dimensions of the collet bits or fingers as described subsequently. The shaft terminates at the terminal end 46 of the pin. In a more preferred embodiment, piston assembly 30 will further contain a biasing means 40, typically a coiled spring which will bias the moveable piston assembly to the retracted position.

Collet assembly 20 is comprised of pin retaining means 18 having a central bore 48 disposed therethrough, said bore permitting insertion of the shaft of the piston assembly therethrough, which has threads 22 engageable with cylindrical void threads 8 at one end and has flange 28 at an opposed end, with annulus 24 defined between the retaining means 22, (e.g., threads) and flange 28. The collet assembly 20 will include at least two opposed collet bits 12, each of which have a flange 26 which is insertable into the retaining means annulus 24, yet which permits pivotal movement of the collet bit flange effected by axial movement by the shaft of the piston assembly. Each collet bit 12 will be a cylinder segment, internally dimensioned so as to approximate the degree of taper of the tapered portion 44, said degree of taper being defined as an oblique surface to a longitudinal axis of the piston shaft and externally dimensioned so as to fit inside an internal diameter of a flexible one-way valve 52.

Figure 2:
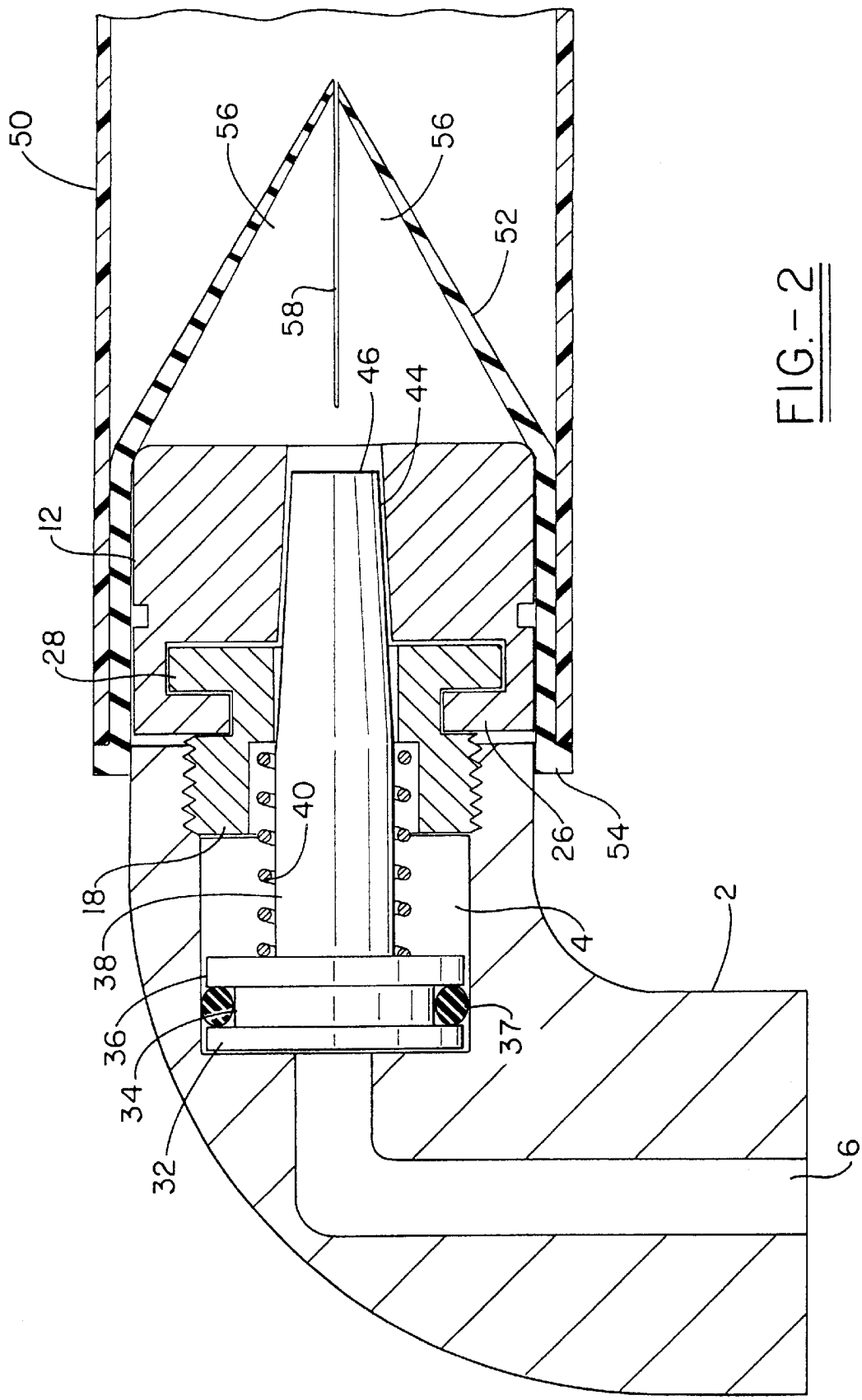
FIG. 2 is an elevational view, in cross-section, showing the elements in position for an overmolding process.

In operation, the core mold will begin with the piston assembly in an essentially fully retracted position as shown in FIG. 2, with biasing means positioning the piston head toward the top of the cylindrical void. A flexible one-way valve 52 having a collar 54 is inserted into one end of an essentially cylindrical hollow plastic conduit 50. The flexible one-way valve will have at least two, generally 4 or more, flaps 56 which are molded into an essentially closed, but generally not leak-proof configuration, an equal number of gaps 58 being between the flaps. Each flap is capable of outward radial movement, from the normally closed position to the open position due to liquid flow through the valve.

Upon activation of the compressed air source, and at the point when the compressed air pressure exceeds the compressive force of the biasing means 40, the piston head moves axially down the cylindrical void 4, with the increasing degree of taper of the frustoconical shaft gradually forcing the collet bits 12 radially outward against the interior walls of the valve and the plastic conduit due to the contacting surfaces, as shown in FIG. 3 thereby firmly positioning the respective components in place and permitting the injection overmolding process to begin.

Injection molding of thermoplastics is a process by which plastic is melted and injected into a mold cavity void, defined in this instance as the void volume between the mold core body and the mold cavity. Once the melted plastic is in the mold, it cools to a shape that reflects the form of the cavity. The resulting part is a finished part needing no other work before assembly into or use as a finished part. The injection molding machine has two basic components: an injection unit to melt and transfer the plastic into the mold, and a clamp to hold the mold shut against injection pressures and for parts removal. The injection unit melts the plastic before it is injected into the mold, then injects the melt with controlled pressure and rate into the mold. When the mold closes, the prefill valve shifts to close the opening to the reservoir. The area behind the main ram is then pressurized. After the injection cycle, the prefill valve opens to allow the clamp to gently open the mold halves.

Important factors in the processing of plastic include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet. This mixing/shearing action is repeated as the material moves along the screw until the plastic is completely melted.

If the polymer is a thermoset, injection molding uses a screw or a plunger to feed the polymer through a heated barrel to decrease its viscosity, followed by injection into a heated mold. Once the material fills the mold, it is held under pressure while chemical crosslinking occurs to make the polymer hard. The cured part is then ejected from the mold while at the elevated temperature and cannot be reformed or remelted.

When thermoplastics are heated in an injection press, they soften and as pressure is applied, flow from the nozzle of the press into an injection mold. The mold has cavities that, when filled with the thermoplastic material, define the molded part. The material enters these cavities through passages cut into the mold, called runners. The mold also has passages in it to circulate a coolant, usually water, through strategic areas to chill the hot plastic. As it cools, the thermoplastic material hardens. When cooled enough, the mold opens and the part is removed.

As shown in FIG. 3, after the completion of the overmolding process, an overmolded polymer 60 sealingly engages the one-way valve 52, and the plastic conduit 50. It is during the above-described injection overmolding process, that the combination of heat and pressure has the potential to shift the alignment of the flexible one-way valve 52 from its initial positioning prior to the overmolding process, potentially leading to a mis-alignment as shown in FIG. 4 wherein the valve is shown skewed inside the plastic conduit, thereby leading to an valve which will permit flow in a reverse direction, due to the mis-alignment of the flaps 56, and thereby defeating the purpose of the valve.

Figure 4:
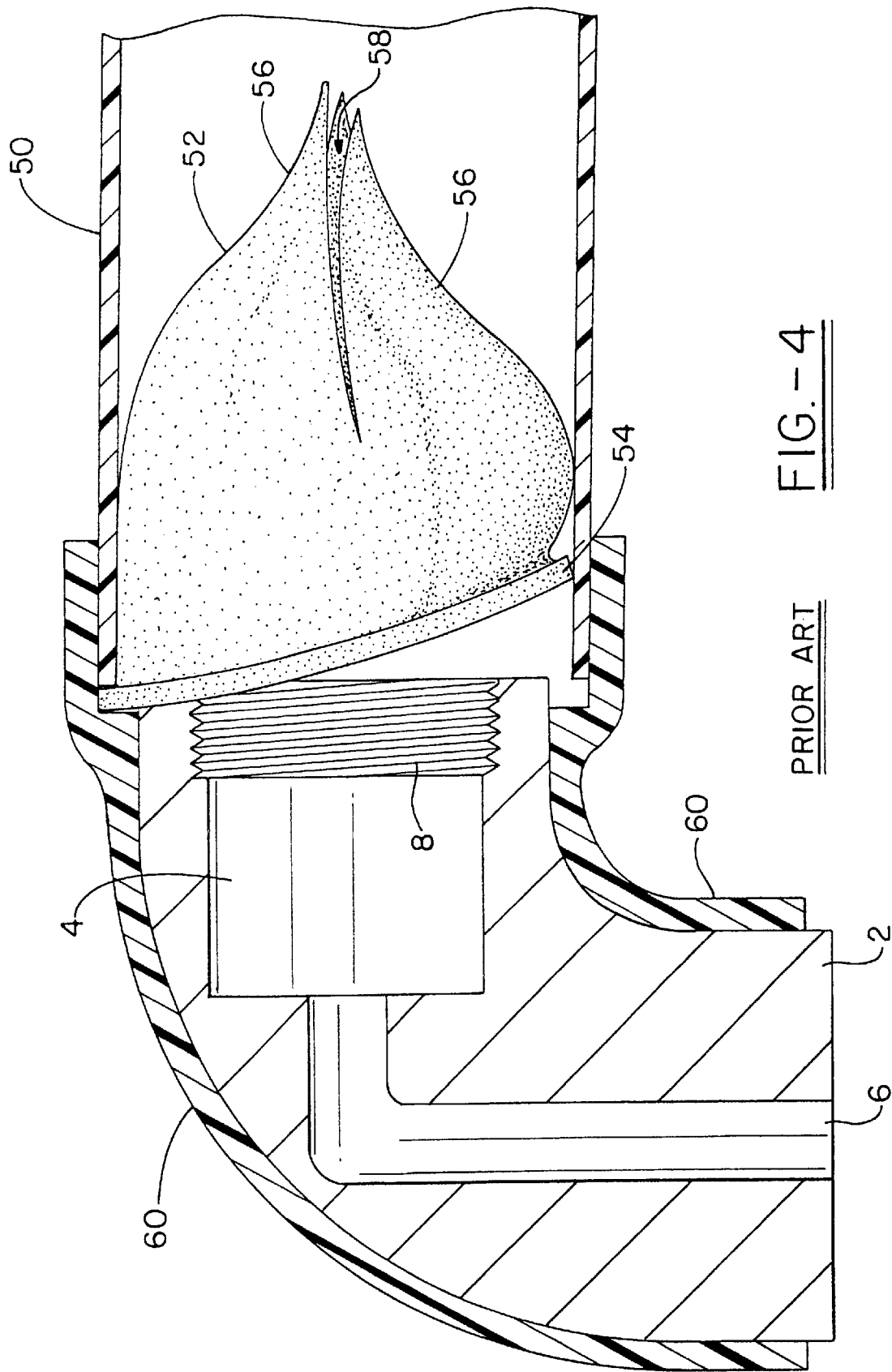
FIG. 4 is an elevational view, in cross-section, illustrating a misalignment which could occur of the valve member when the present invention is not in use.

Due to the radially exerted pressure of the collet bits, the type of mis-alignment shown in FIG. 4 is minimized. After a sufficient period of time for the overmolded polymer to cool, the pressure is released and the piston returns to its normally retracted position, due to the biasing means force. As the tapered shaft moves in conjunction with the piston head, the collet bits return to their normal position within the mold, thereby permitting removal of the finished part from the core hold by the application of a force to pull the part off the mold.

DISCUSSION

While the precise composition of the plastic conduit, overmolded polymer and flexible valve are not required to be of any specified polymer, in general, there are several guidelines which are applicable in the practice of this invention. It is of course, recognized that the precise operating conditions utilized in the overmolding process are well-known in the art and are specific to each injection molded polymer. It is well within the skill of the art to determine the applicable conditions which will result in the appropriate overmolded polymer and plastic conduit. The degree of flexibility of the plastic conduit is not of particular relevance for this invention. The plastic conduit can be a thermoplastic or a thermoset. The key is that the overmolded polymer must be capable of forming a leak-proof bond, either chemical or physical, with the plastic of the conduit.

In the practice of this invention, illustrative and non-limiting examples of the polymers which may be used in various combinations to form the plastic conduit as well as polymers which may be used in the overmolding process would include: polyacetals, typically highly crystalline linear thermoplastic polymers of oxymethylene units; poly (meth)acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyamide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30 Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

The combination of the above polymers must satisfy at least two simultaneous conditions. First, the plastic conduit must not soften and begin melt flow to the point where it looses structural integrity and second, the overmolded polymer must be capable of forming an essentially leak-proof interface with the plastic conduit, preferably through either a chemical and/or physical bond between the underlying plastic and the overmolded plastic. One of the keys is the recognition that the plastic conduit must be capable of maintaining structural integrity during the overmolding conditions during which the overmolded polymer is in melt flow.

While using polymer compositions which have differing softening points is one way to achieve the above objective, there are alternatives, which would include the use of two compositions which have the same softening point, but which are of different thicknesses, thereby through manipulation of the time, temperature and pressure conditions experienced during the molding operation, the plastic conduit would not experience melt flow, even though it had a similar softening point or range. It is also possible that through the incorporation of various additives in the polymeric compositions, e.g., glass fibers, heat stabilizers, antioxidants, plasticizers, etc., that the softening temperatures of the polymers may be controlled.

In a preferred embodiment of the invention, the composition of the overmolded polymer will be such that it will be capable of at least some melt fusion with the composition of the plastic conduit, thereby maximizing the leak-proof characteristics of the interface between the plastic conduit and overmolded plastic. There are several means by which this may be effected. One of the simplest procedures is to insure that at least a component of the plastic conduit and that of the overmolded polymer is the same. Alternatively, it would be possible to insure that at least a portion of the polymer composition of the plastic conduit and that of the overmolded polymer is sufficiently similar or compatible so as to permit the melt fusion or blending or alloying to occur at least in the interfacial region between the exterior of the plastic conduit and the interior region of the overmolded polymer. Another manner in which to state this would be to indicate that at least a portion of the polymer compositions of the plastic conduit and the overmolded polymer are miscible.

In yet another embodiment, composites of rubber/thermoplastic blends are useful in adhering to thermoplastic materials used in the plastic conduit. These blends are typically in the form of a thermoplastic matrix containing rubber nodules functionalized and vulcanized during the mixing with the thermoplastic. The composite article is then obtained by overmolding the vulcanized rubber/thermoplastic blend onto the thermoplastic conduit. In this manner, the cohesion at the interface between these two materials is generally higher than the tensile strength of each of the two materials. The quantity of vulcanizable elastomer may be from 20 to 90% by weight of the vulcanizable elastomer block copolymer combination. This block copolymer comprises a polyether or amorphous polyester block as the flexible elastomeric block of the thermoplastic elastomer while polyamide, polyester or polyurethane semicrystalline blocks for the rigid elastomeric block of the thermoplastic elastomer. In this approach, it is postulated, without being held to any one theory of operation or mechanism, that the leak-proof aspect of this linkage utilizes a phenomenon typically used in the formation of moisture-proof electrical connections, i.e., dynamic vulcanization shrink wrap. In this manner, the overmolded polymer is formed having a internally latent stresses which upon the application of heat, permit the relaxation of the stresses with resulting contraction of various polymeric strands within the composition during cooling.

In one specific embodiment of this invention which meets the above criteria, the plastic conduit will be polypropylene and the overmolded polymer is SANTOPRENE® thermoplastic elastomer by Advanced Elastomer Systems having a Shore A durometer of approximately 73. In this Due to the radially manner, due to the fact that the SANTOPRENE® polymer is an ethylene-propylene copolymer, the melt fusion of at least a portion of the polypropylene arms with at least the propylene portion of the SANTOPRENE® will be effected.

VALVE COMPOSITION

The flexible one-way valve composition will generally be of a rubber composition or a thermoplastic elastomeric composition. This is necessary due to the repeated movement of the flaps in response to typically liquid flow therethrough. In a preferred embodiment of the invention, this rubber composition will be an EPDM rubber. EPDM rubbers are well known to those skilled in such art and, generally mean ethylene/propylene terpolymer elastomers, with a minor amount of non-conjugated diene (e.g., 1 to 15 percent of the terpolymer), e.g., hexadiene, dicyclopentadiene or ethylidene norbornene. The unsaturated part of the polymer molecule is pendant from the main chain, which is essentially completely saturated. Suitable diene-based rubbers would include homopolymers of butadiene or isoprene such as cis-1,4-polybutadiene, cis-1,4-polyisoprene, natural rubber and blends thereof. The ethylene propylene diene monomer (EPDM) copolymer comprises repeat units of from about 20 to about 90 weight percent, and more desirably from about 30 to about 85 weight percent ethylene, from about 10 to about 80 weight percent, more desirably from about 15 to about 70 weight percent of at least one alpha olefin having from 3 to 16 carbon atoms (usually mostly propylene) based on the total of ethylene and alpha olefins having from 3 to 16 carbon atoms, and from about 1 to about 15%, of one or more non-conjugated dienes. Examples of non-conjugated dienes would include 1,4-hexadiene and cyclic non-conjugated dienes such as 5 -ethylidene-2-norbornene (ENB), norbornadiene, methylnorbornene, dicyclopentadiene, 2-methylnorbornadiene, 4,7,8,9-tetrahydroindene, 1,5-cyclooctadiene and 5-vinyl-2-norbornene.

The valve composition can also be a butyl rubber, an essentially saturated rubber, and will comprise a copolymer of primarily polyisobutylene (~97%) and a minor amount of polyisoprene (~3%) and halogenated derivatives thereof, e.g., chlorinated butyl rubber and brominated butyl rubber. More generically, the butyl rubber is a copolymer which will comprise at least 50, desirably at least 80 and preferably at least 90 weight percent repeat units from $C_4$ to $C_7$ isomonoolefins having $C_4$ as a majority portion thereof and a conjugated diene.

The valve composition rubber can additionally be one of cis-1,4-polyisoprene rubber (natural and/or synthetic rubber), 3,4-polyisoprene rubber, styrene/butadiene copolymer rubbers, butadiene/acrylonitrile copolymer rubbers, styrene/isoprene/butadiene terpolymer rubbers, and cis-1,4-polybutadiene rubber. The rubber can comprise two or more diene-based rubbers. For example, a combination of two or more rubbers may include combination such as cis-1,4-polyisoprene (natural or synthetic, although natural is preferred), 3,4-polyisoprene rubber, styrene/isoprene/butadiene rubber, emulsion and solution polymerization derived styrene/butadiene rubbers, cis-1,4-polybutadiene rubbers and emulsion polymerization prepared butadiene/acrylonitrile copolymers.

This invention has been described in detail with reference to specific embodiments thereof, including the respective best modes for carrying out each embodiment. It shall be understood that these illustrations are by way of example and not by way of limitation.

What is claimed is:

1. A mold core for overmolding a flexible valve into a plastic conduit comprising:
    a mold core body having a cylindrical void disposed therein at a distal end, said cylindrical void communicated to a conduit through which gas pressure may be applied;
    a piston assembly having:
        a piston head dimensioned for axial movement within the cylindrical void,
        a piston shaft extending axially from the piston head, the shaft having a first cylindrical portion with a first diameter and a second tapered portion with a second diameter at an end of the shaft, the second diameter being smaller than the first diameter; and
        a piston retaining means with a bore disposed therethrough dimensioned so as to permit insertion of the piston shaft;
    at least two collet bits adjacent to the tapered portion of the shaft, each bit comprising an inner cylindrical tapered surface segment, the inner surface being oblique to a longitudinal axis of the piston shaft, the inner surface being tapered essentially the same as the tapered portion of the piston shaft, and an outer cylindrical surface segment, the outer surface dimensioned for insertion inside the flexible valve; and
    a collet bit positioning means, engageable with the piston retaining means.

2. The mold core of claim 1 wherein the piston head has a pair of radial flanges defining an annular groove therebetween.

3. The mold core of claim 2 wherein the piston head has an O-ring dimensioned to fit in the annular groove and provide an essentially leak-tight fit with a cylinder wall of the cylindrical void.

4. The mold core of claim 1 wherein the piston retaining means is a threadably engageable collar.

5. The mold core of claim 4 wherein the collar has a flange at an opposed side from a plurality of threads; and an annular recess disposed between the flange and the threads.

6. The mold core of claim 5 wherein each of the at least two collet bits has a flange dimensioned for insertion into the annular recess.

7. The mold core of claim 1 wherein a biasing means inserted onto the piston shaft and bearing against the piston head and the piston retaining means to bias the piston shaft in a first retracted position.

8. The mold core of claim 1 wherein the diameter of the tapered portion decreases linearly from a tapering point, where it is joined to the cylindrical portion, to the end of the shaft.

9. The mold core of claim 7 wherein application of gas pressure through the conduit drives the piston assembly forward from the retracted position to an extended position and the tapered portion of the piston shaft acts on the at least two collet bits, urging them radially outward to retain the flexible valve against the plastic conduit during an overmolding process.

* * * * *

UNITED STATES PATENT AND TRADEMARK OFFICE
CERTIFICATE OF CORRECTION

PATENT NO : 6,116,884
DATED : September 12, 2000
INVENTOR(S) : William W. Rowley, et al.

It is certified that error appears in the above-identified patent and that said Letters Patent are hereby corrected as shown below:

Amend Column 7, line 7, after "In this" delete the new paragraph and the words "Due to the radially manner," and continue in the same paragraph, in the same sentence, with "due to the fact...".

Amend Column 7, line 47, by deleting "(-97%)" and subtituting therefor --(~97%)--; and line 48, by deleting "(-3%)" and substituting therefor --(~3%)--.

Signed and Sealed this

Twenty-fourth Day of April, 2001

Attest:

NICHOLAS P. GODICI

*Attesting Officer*     *Acting Director of the United States Patent and Trademark Office*